United States Patent
Shaw et al.

(10) Patent No.: US 6,403,685 B1
(45) Date of Patent: Jun. 11, 2002

(54) ADHESIVE, ELASTOMERIC GEL IMPREGNATING COMPOSITION

(75) Inventors: David Glenn Shaw; John Randolph Pollard, both of Tucson, AZ (US); Robert Aubrey Brooks, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/924,040

(22) Filed: Aug. 6, 2001

Related U.S. Application Data

(62) Division of application No. 09/527,951, filed on Mar. 15, 2000, now Pat. No. 6,310,760.

(51) Int. Cl.[7] .................................................. C08J 5/12
(52) U.S. Cl. ..................... 524/297; 528/306; 525/437; 524/174; 524/539; 361/314; 361/315
(58) Field of Search .................. 528/306; 525/437; 524/174, 297, 539; 361/314, 315

(56) References Cited

U.S. PATENT DOCUMENTS

| | | | | |
|---|---|---|---|---|
| 5,729,427 A | * | 3/1998 | Li et al. | 361/503 |
| 5,737,179 A | * | 4/1998 | Shaw et al. | 361/301.4 |
| 5,738,919 A | * | 4/1998 | Thomas | 429/3 |
| 6,154,357 A | * | 11/2000 | Berger | 361/314 |

* cited by examiner

*Primary Examiner*—Samuel A. Acquah

(57) ABSTRACT

An improved capacitor roll with alternating film and foil layers is impregnated with an adhesive, elastomeric gel composition. The gel composition is a blend of a plasticizer, a polyol, a maleic anhydride that reacts with the polyol to form a polyester, and a catalyst for the reaction. The impregnant composition is introduced to the film and foil layers while still in a liquid form and then pressure is applied to aid with impregnation. The impregnant composition is cured to form the adhesive, elastomeric gel. Pressure is maintained during curing.

12 Claims, 1 Drawing Sheet

ADHESIVE, ELASTOMERIC GEL IMPREGNATING COMPOSITION

This is a division of application Ser. No. 09/527,951, filed Mar. 15, 2000, now U.S. Pat. No. 6,310,760.

GOVERNMENT RIGHTS

This invention was made with Government support under Contract No. DE-AC04- 94AL85000 awarded by the U.S. Department of Energy. The Government has certain rights in the invention.

FIELD OF THE INVENTION

The present invention concerns the impregnation of film-foil capacitors. More particularly, it concerns a gel impregnant that adheres well to film and foil materials and that is flexible enough to expand and contract during thermal cycling.

BACKGROUND OF THE INVENTION

Electrical capacitors are used for storing energy in a variety of applications. Operating voltages for such capacitors range from a few volts (e.g. miniature or micro electronic circuitry) to thousands of volts (e.g. power utility applications). A capacitor comprises a pair of conductive plates or electrodes separated by a dielectric material. The electrodes are typically composed of copper, silver, aluminum foils or vacuum deposited zinc or aluminum. Capacitors utilize a variety of dielectric materials ranging from ceramics, metal oxides, plastic sheets or films to paper.

Higher voltage capacitors are generally constructed of multiple sheets of a dielectric material such as polypropylene or polyester film in between sheets of foil such as aluminum foil. These materials are typically wound into a roll and vacuum impregnated in roll form or collapsed into rectangular elements and then vacuum impregnated. Capacitors intended to operate at voltages greater than 600 V are normally completely impregnated with a low viscosity dielectric-liquid with good gas absorbing properties.

It is important for the operation of high voltage capacitors that all void spaces be filled. Otherwise there will be corona breakdown of voids, which will lead to low breakdown strength and failure. Thus, it is known to impregnate such capacitors with a liquid impregnant such as mineral oil, castor oil, polybutylene, dioctyl phthalate and other liquid impregnants.

It is also known to impregnate such capacitors with epoxy and urethane solid dielectric materials. The impregnants generally fill the void spaces in the capacitor to increase capacitance, reduce corona discharges and aid in the transfer of heat from the capacitor to the outside environment.

On the one hand, it is desirable to use an impregnant that is not liquid so that there will be no leaking of fluid, with its possible negative environmental impact, in the event of a capacitor failure or in case the capacitor case is not well sealed. However, voids can be created in a solid impregnant when it cures. Moreover, voids can develop more readily with a solid impregnant during thermal cycling of a capacitor in service, where temperatures can range between −55° C. and 85° C. In particular, low temperatures can cause solid capacitor materials to contract, which can open up voids in the capacitor. If these voids are adjacent to a foil edge where there is a high electric stress, there can be a gas void breakdown at high voltages that would cause the capacitor to fail at unusually low breakdown voltages. Thus, it is not common to use solid or gel materials as impregnating materials for high voltage capacitors.

Rather, despite environmental concerns, high voltage capacitors are commonly impregnated with a low viscosity liquid with good gas absorption properties. The liquid is better able to expand and contract along with the dissimilar capacitor materials during thermal cycling to avoid formation of voids within the capacitor. Yet, it would be desirable to have a gel impregnant that is flexible enough and adherent enough to the capacitor materials to prevent voids from occurring. It would also be desirable to have a dielectric gel impregnant with good insulating properties, high dielectric constant and good compatability with capacitor materials.

The normal impregnation process begins by placement of capacitors to be impregnated in a chamber that is then evacuated. The vacuum chamber is flood filled with the impregnant so that the capacitors inside the chamber are covered. Thereafter, the chamber is exposed to atmospheric pressure, which aids in forcing the impregnant into any voids in the capacitor. While this method is satisfactory for low viscosity liquid impregnants, it does not always work well with higher viscosity materials or gels. Accordingly, an improved, more reliable process for impregnation would be desirable.

SUMMARY OF THE INVENTION

According to the present invention, a gel impregnant has been developed that adheres well to film and foil materials of a film-foil capacitor and is flexible enough to expand and contract during thermal cycling without creating voids. Film-foil capacitors made using the gel impregnant have increased capacitance and energy density, and have high breakdown voltages and a breakdown voltage distribution that has very low two sigma limits (less than 10% of the average breakdown voltage) Moreover, the impregnant is a gel rather than a liquid, thereby reducing the possibility of leakage from the capacitor.

The preferred composition of an impregnant precursor according to the present invention can comprise up to five components: (1) a plasticizer; (2) a primary polyol; (3) a maleic anhydride able to react with the primary polyol; (4) a crosslinking material to impart toughness to the finished gel; and (5) a catalyst. The fourth component is optional but presently preferred to improve the toughness of the cured gel. At least a small amount of a catalyst is needed to aid the curing process.

Thus, the preferred elastomeric gels once cured are polyesters formed by the reaction of a polyol with a maleic anhydride. The polyester is blended with an unreactive component (i.e. a plasticizer) which provides the softening point behavior and imparts the elastomeric properties of the bulk dielectric impregnating material. It also lowers the viscosity of the blend, which facilitates the impregnation process. The plasticizer is preferably an economical and environmentally safe material that does not react with the film and foil of the capacitor.

According to the principles of the invention, film-foil capacitor rolls are constructed. The liquid components that comprise the impregnating gel are mixed and de-gassed under vacuum prior to impregnation. The capacitor rolls are vacuum dried and the chamber containing the capacitor rolls are back-filled with de-gassed liquid components that comprise the impregnating gel. At this stage the liquid components preferably are in the form of a medium viscosity reactive liquid.

After being submerged in the liquid mixture, the capacitor rolls are pressurized with the liquid mixture in order to insure complete impregnation. Preferably, the pressure applied is in excess of 100 psi. The pressure on the capacitor rolls is maintained while the liquid components are cured to form the impregnating gel. The gels are cured at room temperature or higher over a period of time ranging from a few minutes to a few hours depending on the temperature used and the formulation of the gel components. The curing time can be reduced by elevating the cure temperature or by increasing the concentration of either or both of the reactive components or any catalyst component. Preferably, a temperature above 25° C. is used for curing. The impregnated capacitors are then recovered from the curing chamber, allowed to cool if necessary and subsequently encased and/or sealed in a case or container.

Capacitors constructed from sheet materials and gel impregnating dielectric materials according to the principles of this invention have unusually high breakdown voltage and even after thermal cycling retain a very high breakdown voltage. Also, the statistical distribution of the breakdown voltage is unusually tight. The dielectric gel impregnating materials of the present invention comprise solid impregnating materials formed by curing liquid reactants with low shrinkage during curing and reduced gas voids upon curing. Moreover, the elastomeric, dielectric impregnating gels exhibit good adhesion to the metallized film and foil capacitive materials and are flexible enough to expand and contract during thermal cycling without creating gas voids.

A gel impregnated capacitor of the present invention has improved properties of capacitance, increased energy densities and breakdown voltages, as compared to preexisting capacitors. It is believed, that these advantages are achieved both because of the high pressure impregnation, particularly the use of high pressure during curing of the impregnant, and because of the stickiness and softness of the resulting gel material. The gel has a high adhesive property to the film and the foil and does not come loose even with the most rigorous thermal cycling. Also, the softness or flexibility of the gel material allows it to follow the expansion and contraction of the other capacitor materials during thermal cycling.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF THE INVENTION

Figure 1:
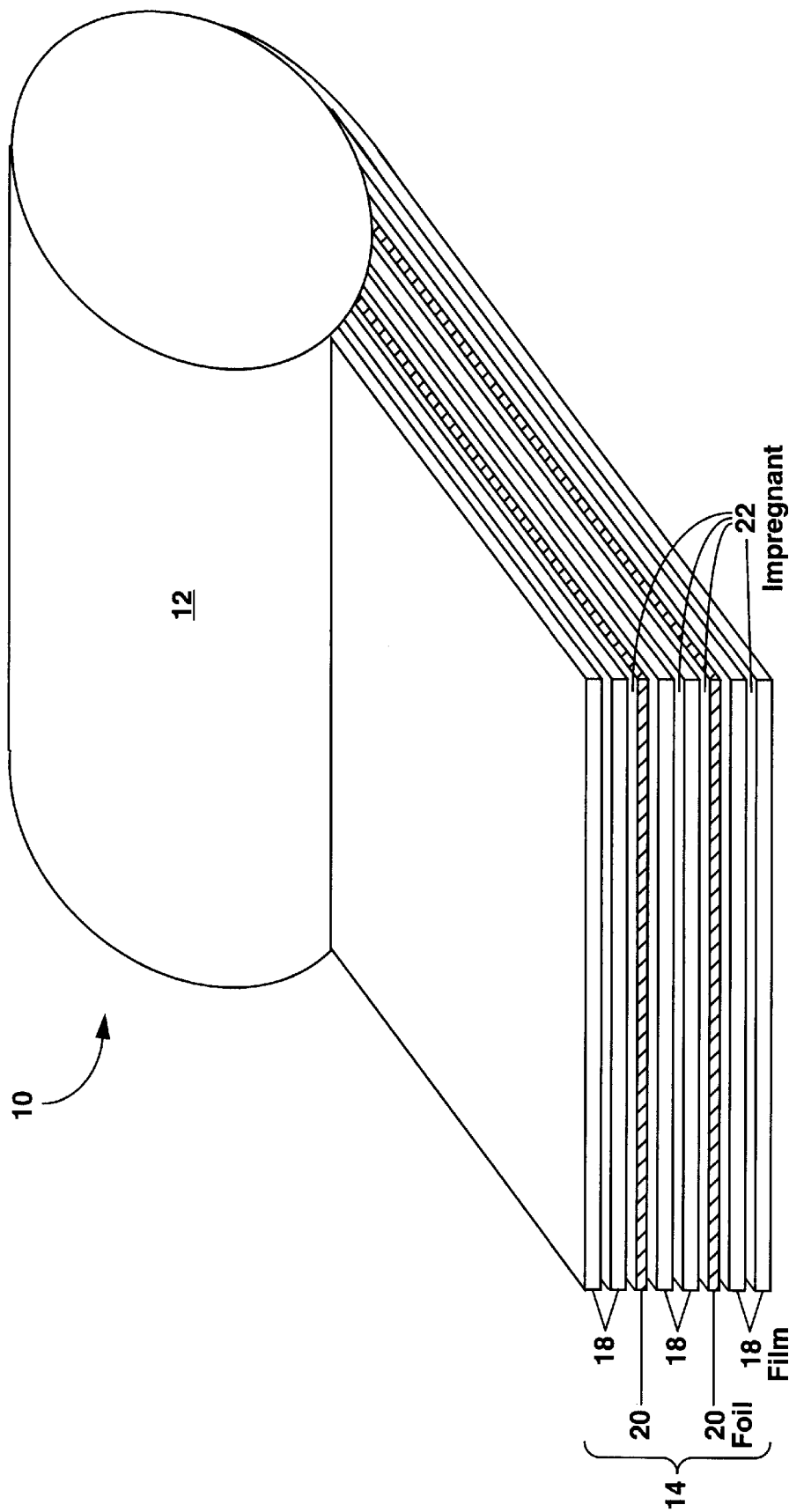
FIG. 1 illustrates schematically a wound capacitor roll comprising metal foil and a dielectric film constructed according to the principles of the invention.

Referring to FIG. 1, a capacitor roll 10 constructed according to the principles of the invention has a generally cylindrical shape in the form of a wound can 12. Some windings at the edge of the can are pulled away to show one or more sheets of film and foil material 14 making up the can. Each sheet is wound into a cylindrical roll and comprises alternating layers of dielectric film 18 and metal foil 20 coiled in a tight spiral. The layers of metal foil form the electrodes of the capacitor. Typically, multiple sheets of an insulating material are in between the sheets of foil to form the dielectric.

The capacitor rolls 10, are placed in a chamber and are dried under vacuum at a temperature in the range of about 50° C. to about 100° C., depending upon the film material used in the rolls, for at least one half hour and preferably for one hour. For polyester films the drying temperature is preferably 85° C. For polypropylene films the drying temperature may be 50° C. The liquid components that comprise the impregnating gel are mixed and then de-gassed under vacuum prior to impregnation. The chamber containing the capacitor rolls 10, under vacuum, is back-filled with the de-gassed liquid components that comprise the impregnating gel. The back-filling proceeds to an extent such that the capacitor rolls 10, are submerged in the liquid mixture. The capacitor rolls 10 are then pressurized to at least 100 psi, maintaining this pressure at at least 25° C., preferably 40° C., or at least one hour, normally for four to five hours, with the liquid mixture in order to insure complete impregnation.

The end view of the gel impregnated capacitor windings shows the dielectric film layers 18, the metal foil layers 20, and the impregnated impregnating gel 22 in between each of the layers. The pressure on the capacitor rolls 10 is maintained in the chamber so that the liquid mixture is completely drawn into the voids between the dielectric film layers 18 and the metal foil layers 20. The pressure on the capacitor rolls 10 is maintained in the chamber throughout the curing of the liquid mixture to formation of the impregnating gel 22. The gel is cured at room temperature up to 125 degrees C. over a period of time up to 4 to 5 hours, depending on the formulation of the gel components. The impregnated capacitors are recovered from the chamber and subsequently encased and/or sealed in a container. The layers of the dielectric film 18 and the impregnating gel 22 between the foil electrode layers 20 permits accumulation of charge in the capacitor.

Referring to the dielectric film 18, it is preferred that it comprises a thin sheet of an electrically insulating material, such as polypropylene, polyethylene, polyvinylidene, a polycarbonate or a polyester; the thermoplastic material having a stable dielectric constant and high dielectric strength. In a preferred embodiment, dielectric films comprise polypropylene or a polyester, having a thickness that ranges from about 1 to 100 microns.

Referring to the foil of electrode material 20, it is desired that the material be selected from the group consisting of metals and metal alloys. Preferred electrically conducting materials are aluminum, zinc and alloys of the two metals. The metals selected are preferably those that can be obtained or formed in a foil. In the case of aluminum foil electrodes, the thickness range is preferably about 5 to 10 microns.

With respect to the gel impregnating material 22, it is desired that the impregnating gel composition comprise an adhesive, elastomeric gel. The elastomeric gels referred to in the invention are polyesters formed by the reaction of a polyol with a maleic anhydride. A polyester is blended with an inert component, which comprises a plasticizer and provides the desired softening point behavior as well as imparts the low viscosity and elastomeric properties of the bulk impregnating gel material. It is also desired that the plasticizer be an economical and environmentally benign material that does not react with the metal foils or thermoplastic films of the capacitor.

It is preferred that the gel impregnating material be a solid as opposed to a liquid dielectric material, so that there is no leakage of dielectric fluid in the event of a capacitor failure or in cases where the capacitor casing is not well sealed. The gel impregnating materials and the high pressure impregnation process of the present invention obviate the problems associated with liquid impregnating materials used in capacitors, namely, that the liquid components undergo significant shrinkage during the curing process, which introduces voids in the capacitor and as a consequence leads to corona induced failure.

The shrinkage problem also rendered the capacitor roll vulnerable to the creation of voids during subsequent thermal cycling of the capacitor. In particular, low temperatures cause the capacitor sheet materials to contract, which can open up voids in the capacitor roll. If the voids are adjacent to a foil edge where there are high electric stresses, a gas void dielectric breakdown can occur at high operating voltages, which would result in capacitor failure at unusually low breakdown voltages.

The gel impregnating materials of the present invention are both flexible enough and adherent to the capacitor sheet materials to prevent or eliminate such voids from occurring. Moreover, the formulations of the gel impregnating materials are designed such that shrinkage of the gel is minimized upon curing. It is preferred to have materials with good impregnating properties with minimal shrinkage during curing so voids are not introduced and internal stresses are minimized at the gel impregnant/metal foil/dielectric film interfaces. It is also preferred that the gel impregnating materials possess excellent insulating properties, high dielectric constants and good compatibility with capacitor sheet materials.

The gel impregnant also has good adhesive properties with respect to the dielectric film and metal foil materials used in the capacitor. That is, the blend provides sufficient adhesion to the film and foil materials that it can not be easily wiped off without using some sort of scraping mechanism. It is preferable that the adhesive property be maintained throughout the range of temperatures the capacitor will see in operation such that the gel does not come loose even with the most rigorous thermal cycling. With the preferred gel compositions of the present invention it is almost impossible to completely scrape or clean the gel material from the foil and film.

The resulting blend also preferably has a relatively low viscosity, i.e., less than 500 centistokes at 25° C., which facilitates complete impregnation, and is quite soft so it can flex with the expansion and contraction of the other capacitor materials during thermal cycling, a highly desirable property. Preferably, the gel has a durometer value below 0030 shore hardness.

Formulation of Impregnating Gel

The preferred composition has five components. The first is a plasticizer which has the role of providing a high dielectric constant (DPB=6.2) to the mixture and consequently a higher capacitance to the capacitor roll after impregnation and a low viscosity which allows for the impregnant to move more easily into the roll and provide complete impregnation. The plasticizer also must have good insulation resistance and high breakdown strength. Generally the ester plasticizers such as DOP (di-octyl phthalate) and DBP (di-butyl phthalate) are good. DBP is optimum and the optimum composition contains 67.3% by weight of DBP. A range from about 50% to about 80% by weight DBP is possible.

The second component is a primary polyol which is a polybutadiene diol such as R-45 HTLO from Elf Autochem. The optimum amount is 13.3% by weight although a range of about 8% to about 20% by weight is possible.

The third component is a maleic anhydride which is reacted with the primary polyol. An example of the maleic anhydride is the MA-10 material from Ricon resins. The optimum amount is 16% by weight and a range of about 10% to about 25% by weight is possible. Note that the second and third components should be used in an stoichiometrically optimized amount based on the functionality of the polyols and the maleic anhydride to achieve the desired physical properties.

The fourth component is a crosslinking material which gives the gel a certain toughness and an example of this is the Solvermol VP95 material from Henkel. The optimum amount is 2.4% by weight but a range of 0% to about 4% by weight is possible.

The fifth component is a catalyst. An example of this is the DAMA 1010 material from Albemarle. The optimum amount is 1% by weight and a range of about 0.1% to about 3% by weight is possible.

EXAMPLE

A set of identical capacitors were made. The capacitors were designed to yield a capacitance of 0.5 microfarads. They were each constructed of polyester film rolled with aluminum foil. The rolls were then impregnated with the most preferred optimum gel composition according to the present invention. Impregnation was achieved using a vacuum chamber that, after the rolls were placed inside, was evacuated and then flood filled with the gel precursor liquid. For one group of rolls, the chamber was then exposed to atmospheric pressure to assist impregnation. For a second group of rolls, a pressurized piston was used to place the chamber under a pressure of 100 psi to assist impregnation and the pressure was maintained during curing. The rolls were then finished into capacitors.

For both groups, capacitance was measured before impregnation and after the impregnation and curing of the gel. The group using atmospheric pressure to assist impregnation showed about a 12–15% increase in capacitance over the non-impregnated rolls. The group using 100 psi pressure to assist impregnation showed about a 20–25% increase in capacitance over the non-impregnated rolls. Some of the capacitors in the group using high pressure impregnation were tested for breakdown voltage before any thermal cycling was performed on the capacitors. Those capacitors showed a range of breakdown voltages from about 10.5–11.5 kv.

The remaining capacitors in both groups were thermal cycled. That is, they were placed in a cold box and cooled to −55° C. The capacitors were held at −55° C. for two hours and then removed from the cold box and allowed to warm to room temperature. Thereafter, they were placed in an oven and their temperature raised to 70° C. They were held at 70° C. for two hours. The capacitors were then removed from the oven and allowed to cool to room temperature. After thermal cycling, the capacitors were tested for breakdown voltage. The high pressure impregnated capacitors showed breakdown voltages ranging from about 9–10 kv. The atmospheric pressure impregnated capacitors showed breakdown voltages of about 5 kv.

Many modifications and variations in the preparation of gel impregnating materials from their respective liquid components will be apparent to those skilled in the art. It will, therefore, be understood that within the scope of the following claims this invention may be practiced otherwise than as specifically described.

What is claimed is:

1. An impregnant blend for film and foil layers comprising:

a polyester formed by the reaction of a polyol with a maleic anhydride;

a catalyst for the reaction; and a plasticizer.

2. An impregnant blend according to claim 1 also comprising a crosslinking material to provide toughness to the impregnant.

3. An impregnant blend according to claim 1 wherein the polyol is a polybutadiene diol that is present in the blend, before reaction, in a range of from about 8% to about 20% by weight of the blend.

4. An impregnant blend according to claim 3 wherein the polyol is present in an amount of 13.3% by weight of the blend.

5. An impregnant blend according to claim 1 wherein the maleic anhydride is present in the blend, before reaction, in a range of from about 10% to about 25% by weight of the blend.

6. An impregnant blend according to claim 5 wherein the maleic anhydride is present in an amount of 16% by weight of the blend.

7. An impregnant blend according to claim 1 wherein the plasticizer is di-butyl phthalate that is present in the blend in a range of from about 50% to about 80% by weight of the blend.

8. An impregnant blend according to claim 7 wherein the plasticizer is present in an amount of 67.3% by weight of the blend.

9. An impregnant blend according to claim 1 wherein the catalyst is DAMA 1010 that is present in the blend in a range of from about 0.1% to about 3% by weight of the blend.

10. An impregnant blend according to claim 9 wherein the catalyst is present in an amount of 1% by weight of the blend.

11. An impregnant blend according to claim 2 wherein the crosslinking material is Solvermol VP95 that is present in the blend in a range of from about 0% to about 4% by weight of the blend.

12. An impregnant blend according to claim 11 wherein the crosslinking material is present in an amount of 2.4% by weight of the blend.

* * * * *